(12) United States Patent
De Narvaez et al.

(10) Patent No.: US 11,106,727 B1
(45) Date of Patent: Aug. 31, 2021

(54) USER-GUIDED ITERATIVE SOUND RETRIEVAL

(71) Applicant: Avid Technology, Inc., Burlington, MA (US)

(72) Inventors: Andres Rajiv Arora De Narvaez, Bezrzecze (PL); Hasan Sercan Atli, Szczecin (PL)

(73) Assignee: AVID TECHNOLOGY, INC., Burlington, MA (US)

( * ) Notice: Subject to any disclaimer, the term of this patent is extended or adjusted under 35 U.S.C. 154(b) by 0 days.

(21) Appl. No.: 17/092,952

(22) Filed: Nov. 9, 2020

Related U.S. Application Data (60) Provisional application No. 63/066,372, filed on Aug. 17, 2020.

(51) Int. Cl.
    *G06F 16/632* (2019.01)
    *G06F 16/683* (2019.01)
    *G06F 16/638* (2019.01)
    *G06F 16/635* (2019.01)

(52) U.S. Cl.
    CPC ......... *G06F 16/632* (2019.01); *G06F 16/635* (2019.01); *G06F 16/638* (2019.01); *G06F 16/683* (2019.01)

(58) Field of Classification Search
    CPC .... G06F 16/632; G06F 16/635; G06F 15/638; G06F 16/683
    USPC .................... 700/94; 707/723, 706, 725, 727
    See application file for complete search history.

(56) References Cited

U.S. PATENT DOCUMENTS

| | | | | |
|---|---|---|---|---|
| 8,280,902 B2 * | 10/2012 | Lewis | ................... | G06F 16/951 |
| | | | | 707/766 |
| 2006/0074898 A1 * | 4/2006 | Gavalda | ................ | G06F 16/685 |
| 2009/0070421 A1 * | 3/2009 | Samn | ................... | G06Q 10/107 |
| | | | | 709/204 |

OTHER PUBLICATIONS

AudioSet, Announding AudioSet: A Dataset for Audio Event Research, Google AI Blog, Mar. 30, 2017, 1 page.
FSD50K, Eduardo Fonseca et al., Zenogo, Oct. 2, 2020, 1 page.
ProSoundEffects Press Release, ProSoundEffects Releases Master Library 2.0 at NAB, Apr. 11, 2015, 3 pages.
Soundly Available Now for Free, Digital Cinema Report, Dec. 8, 2016, 1 page.
Soundsnap Review, BBCs Click, by Kate Russell, Jan. 16, 2009, 3 pages.

\* cited by examiner

*Primary Examiner* — Melur Ramakrishnaiah
(74) *Attorney, Agent, or Firm* — Oliver Strimpel (57) ABSTRACT

Tagged sound file libraries are searched using an iterative search application. A searcher specifies a multi-term search query which is directed to the sound libraries. Responsive audio files from the libraries are ranked by confidence levels for the occurrence of sounds corresponding to searched terms, weighted by user-determined search term priorities. High-ranking candidate audio files are presented to the user who is able to indicate a preference or a disfavoring of the candidates. Based on the feedback, the application adjusts the priorities of the individual search terms in the search query, adds or removes search terms from the query, and performs a new search with a revised set of search terms. The results are ranked using the adjusted priorities. The iterative search locates files with desired sounds that conform to the initial search or that have evolved from it under the user's direction.

21 Claims, 6 Drawing Sheets

USER-GUIDED ITERATIVE SOUND RETRIEVAL

CROSS REFERENCE TO RELATED APPLICATION

This application claims right of priority to and the benefit under 35 U.S.C. § 119(e) of U.S. provisional patent application Ser. No. 63/066,372, filed Aug. 17, 2020.

BACKGROUND

When a sound designer needs an audio element to serve a particular purpose, such as to accompany an image, a user interaction, or both as with games and virtual reality experiences, the designer typically searches libraries of existing sounds, rather than create a new sound from scratch. The sound libraries may be commercial, open source, public domain, or homegrown in nature. The search process usually requires that the sound designer audition multiple candidate sound files from multiple libraries before selecting leading candidates for import into a digital audio workstation. The selection process involves a creative decision based on an evaluation of the candidate sounds' technical characteristics and aesthetic properties.

Once imported, the files may be used in their existing form, but more often they require modification before the file can serve its intended purpose. Such modification may involve time-consuming editing, layering, and audio processing techniques, such as time-stretching, pitch-shifting, noise reduction and harmonic enhancement among others.

Thus, a successful conclusion of a search depends both on the ability to locate appropriate audio files as well as to subsequently modify them so that they serve their intended purpose in an effective and aesthetic manner.

Sound libraries include metadata to facilitate searching. The metadata is either read when performing a search or is included in an index and categorized in a database. Most commonly, descriptive keywords are included as part of filenames since they can be read using operating-system level file browsers without additional tools. Audio files are also tagged through manually added information in open metadata containers such as BEXT and iXML and/or proprietary formats which can only be read by specialized sound librarian applications. However, even in thoroughly tagged files, metadata usually describes only the main elements in a sound file such as the subject of the recording, often without mentioning secondary or unintended sounds which are also present within the file. Since such secondary material is not searchable and it is inefficient to keep full-length recordings, library audio files are commonly edited to contain only a portion of an original recording directed to their main subject and are tagged accordingly. Secondary sounds are therefore either lost or, less frequently, saved and tagged separately by the most meticulous sound editors.

The search process may also be hampered by a disparity between the language used by a sound designer to specify a search query and the language used by a sound recordist or an audio editor when tagging the edited segments in a library with metadata. Thus, the searcher may be forced to express search requirements using keywords that coincide with the descriptive metadata in a database, or alternatively navigate through a hierarchy of one or more catalogs provided by third parties, often with an unfamiliar folder structure, auditioning files that appear promising. Once a suitable file has been found and chosen, it may be imported into the project and the search process repeated multiple times.

Thus, current methods of searching for sounds in audio libraries suffer from a number of limitations which result in searches returning suboptimal results that may need considerable processing before meeting requirements. Furthermore, the searches may return only a fraction of the audio files present in the libraries that are potentially responsive to the search. There exists a need for methods that assist the quality, breadth, and efficiency of sound library searches.

SUMMARY

In general, an iterative search process enables a sound designer to locate sound library audio files containing sounds that conform to an initial search requirement or that contain sounds that have evolved from the initial search under the direction of the sound designer.

In general, in a first aspect, a method of locating an audio file responsive to a search comprises: receiving an initial search query from a user, the query comprising an initial plurality of search terms; for each search term of the initial plurality of search terms, determining from the search query a priority for the search term; issuing a first search query comprising a first plurality of search terms to one or more audio file databases, wherein the first search query is based on the initial search query; receiving a plurality of candidate audio files responsive to the first search query; for each candidate audio file of the plurality of received candidate audio files, determining a confidence level weighted by search term priorities that the candidate includes the first plurality of search terms; presenting first generation search results to the user, wherein the first generation results comprise a set of audio files of the plurality of candidate audio files ranking highest in weighted confidence level; receiving an indication from the user of at least one of a preference for a selected one of the first generation results and a disfavoring of a selected one of the first generation results; and in response to receiving the user preference: if the indication from the user includes a preference for a selected one of the first generation results, automatically generating a revised search query by adding a new search term to the search query, wherein the new search term is a term associated with high confidence with the selected one of the first generation results; and if the indication from the user includes a disfavoring of a selected one of the first generation results, automatically generating a revised search query by adding a new search term preceded by an exclusion operator, wherein the new search term is a term associated with high confidence with the disfavored one of the first generation results; issuing the revised search query to the one or more audio file databases; receiving a second plurality of candidate audio files responsive to the revised search query; for each candidate audio file of the second plurality audio files, determining a confidence level weighted by priorities of search terms of the revised search query that the candidate includes search terms of the revised search query; and presenting second generation search results to the user, wherein the second generation results comprise a set of sound files of the second plurality of candidate audio files ranking highest in weighted confidence level.

Various embodiments include one or more of the following features. The priority of an initial search term is determined from a priority explicitly specified by the user. The determination of the priority of an initial search term is based on a syntax of the search query. If the indication from the user includes a preference for a selected one of the first generation results, adjusting upwards a priority of a search term present with high confidence in the selected one of the first generation results; and wherein the weighted confidence levels of the second plurality of candidate audio files are determined using the adjusted priority of the search term. The search term is included or is not included within the first search query. If the indication from the user includes a disfavoring of a selected one of the first generation results, adjusting downwards a priority of a search term present with high confidence in the selected one of the first generation results; and wherein the weighted confidence levels of the second plurality of candidate audio files are determined using the adjusted priority of the search term. The search term is included within the first search query. The search term is not included in the first search query. Presenting first generation results to the user includes, for each audio file of the plurality of candidate audio files, displaying an audio waveform view of a segment of the candidate audio file, the segment including a portion of the candidate audio file associated with a search term of the plurality of search terms. The search term of the plurality of search terms is the search term of the plurality of search terms that has the highest confidence level in the candidate audio file. The search term is displayed in association with the waveform display. In response to the user selecting a candidate audio file: displaying a detailed waveform representation of the selected candidate audio file, the detailed waveform representation including a display of each of a plurality of search terms associated with the selected candidate audio file. The user is able to select in the detailed waveform representation a portion of the selected audio file to be imported into an audio editing application. The first plurality of search terms includes one or more synonyms of the initial plurality of search terms. The first plurality of search terms represents a mapping of the initial plurality of search terms onto search terms that are associated with audio files in the one or more audio file databases. The first plurality of search terms includes one or more search terms that are translations of one or more search terms of the initial plurality of search terms from a first language into a second language. Presenting the first generation results includes, for each candidate audio file an indication of a set of terms associated at a high confidence level with sounds that are present in the audio file. For each candidate audio file C of the plurality of the received candidate audio files, the weighted confidence level We given by $$W_C = \sum_T R_T P_T \Big/ \sum_T P_T$$

wherein $R_T$ is a confidence received from a database that returned candidate audio file C that a sound responsive to search term T is present in candidate sound file C, $P_T$ is the priority of the search term T, and $\Sigma_T$ is a summation over the first plurality of search terms; and for each candidate audio file C' of the second plurality of audio files, the weighted confidence level $W_{C'}$ given by $$W_{C'} = \sum_{T'} R_{T'} P_{T'} \Big/ \sum_{T'} P_{T'}$$

wherein $R_{T'}$ is a confidence received from a database that returned candidate audio file C' that a sound responsive to search term T' is present in candidate sound file C', $P_{T'}$ is the priority of the search term T', and $\Sigma_{T'}$ is a summation over each search term T' of the plurality of revised search terms.

In general, in another aspect, a computer program product comprises: a non-transitory computer-readable medium with computer-readable instructions encoded thereon, wherein the computer-readable instructions, when processed by a processing device instruct the processing device to perform a method of locating an audio file responsive to a search comprising: receiving an initial search query from a user, the query comprising an initial plurality of search terms; for each search term of the initial plurality of search terms, determining from the search query a priority for the search term; issuing a first search query comprising a first plurality of search terms to one or more audio file databases, wherein the first search query is based on the initial search query; receiving a plurality of candidate audio files responsive to the first search query; for each candidate audio file of the plurality of received candidate audio files, determining a confidence level weighted by search term priorities that the candidate includes the first plurality of search terms; presenting first generation search results to the user, wherein the first generation results comprise a set of audio files of the plurality of candidate audio files ranking highest in weighted confidence level; receiving an indication from the user of at least one of a preference for a selected one of the first generation results and a disfavoring of a selected one of the first generation results; and in response to receiving the user preference: if the indication from the user includes a preference for a selected one of the first generation results, automatically generating a revised search query by adding a new search term to the search query, wherein the new search term is a term associated with high confidence with the selected one of the first generation results; and if the indication from the user includes a disfavoring of a selected one of the first generation results, automatically generating a revised search query by adding a new search term preceded by an exclusion operator, wherein the new search term is a term associated with high confidence with the disfavored one of the first generation results; issuing the revised search query to the one or more audio file databases; receiving a second plurality of candidate audio files responsive to the revised search query; for each candidate audio file of the second plurality audio files, determining a confidence level weighted by priorities of search terms of the revised search query that the candidate includes search terms of the revised search query; and presenting second generation search results to the user, wherein the second generation results comprise a set of sound files of the second plurality of candidate audio files ranking highest in weighted confidence level.

DETAILED DESCRIPTION

We describe methods of searching for audio material in sound libraries containing tagged audio files. Each audio file may be tagged not only with a tag representing a main subject or sound type within the file, but also with one or more other tags that indicate additional sounds or characteristics of the sound file. Such libraries may include files previously recorded by the sound designer performing the search, or may be third party libraries, including commercial, community, or open source libraries. The tags may have been added manually either by the creator of the file, by third parties, or by automated listening services, including those relying on neural network models that have been trained on human-labelled audio file data sets. Examples of such libraries include AudioSet, a research project of Google® LLC, Soundsnap, and ProSound Effects. Listening services that are able to tag audio files automatically are under development and, when available, may have the capacity to boost the number of tagged sound files significantly. Manual or automated tagging methods are not limited to a creating just a single tag for a file. Instead, multiple tags may be used to reflect the presence of multiple sounds in the file. For each tag, the temporal location of the sound it refers to may be included as a timecode or temporal offset from the start of the file. In addition, each tag is associated with a confidence level that indicates a degree of confidence that the sound referenced by the tag is actually present in the file at the specified location.

A portion of an audio file that contains a sound referenced by a particular tag is referred to herein as an audio segment. If a particular sound type occurs in more than one location within a file, multiple segments having different temporal locations within the file are associated with the tag. A segment generally corresponds to a portion of a sound file but may correspond to the entire file. Sound libraries vary in the relationship between tags and the portions of the sound file containing the referenced sound. The following are three tagging conventions: (i) a tag is associated with an entire file, without any information as to where in the file the tagged sound occurs; (ii) a tag is associated with a fixed or variable temporal span of the audio file containing the referenced sound; and (iii) a tag defines a specific temporal location defining the location of the reference sound, but no temporal span is provided. The duration of the span defined in libraries of type (ii) may equal the duration for which the tagged sound is present, or it may include a longer portion of the file, which may provide a sound designer with material for a seamless integration of the sound into a project. In certain libraries, such as AudioSet, tags are assigned to the full duration of segment that includes the tagged sound. Freesound annotator, a platform enabling users to add annotations to sound files, deploys tags describing the presence of a sound together with the duration of the file with one or four designations: present and predominant, present but not predominant, not present, and not certain.

Figure 1:
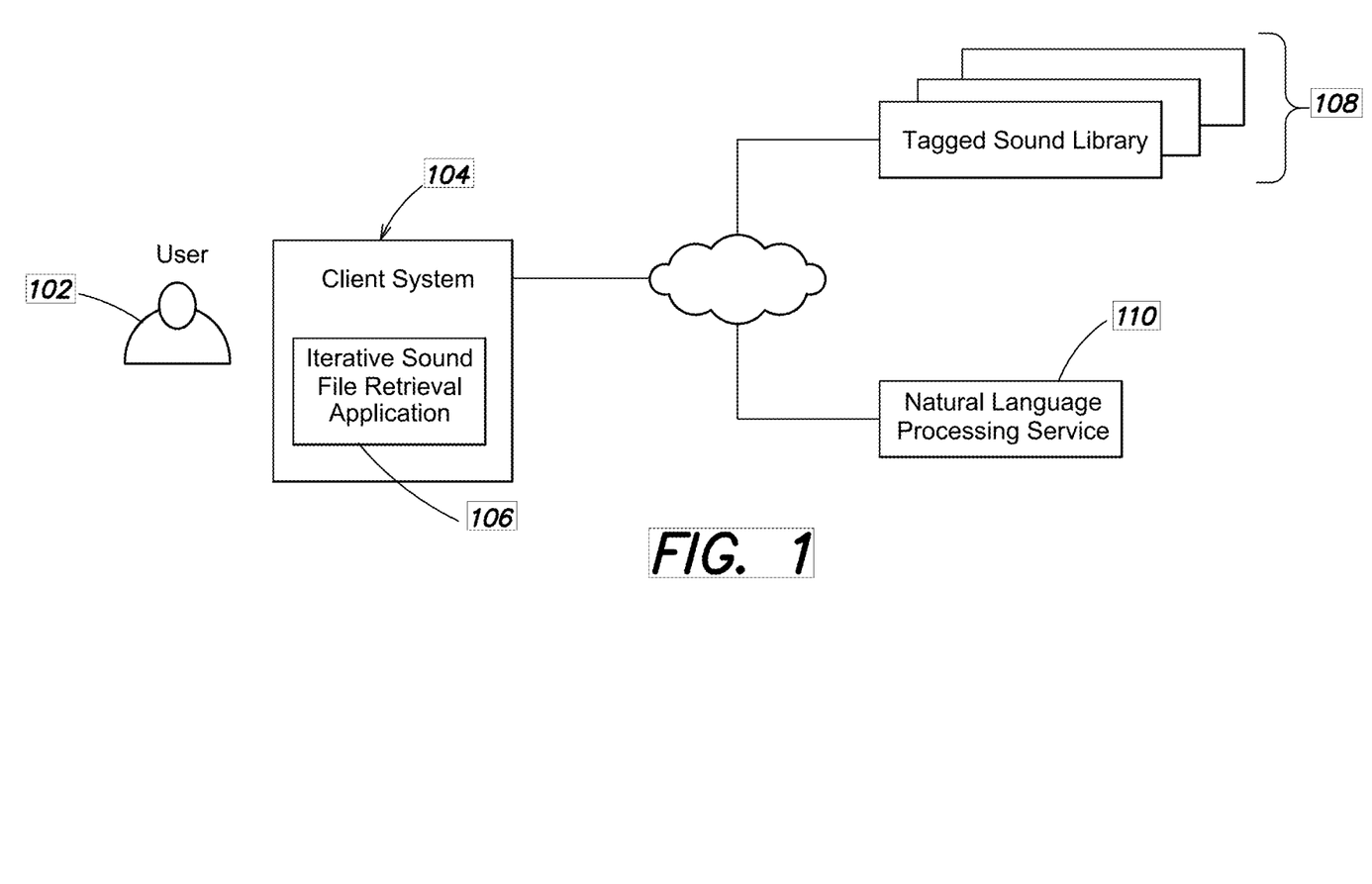
FIG. 1 is a high-level block diagram of a system for iteratively searching sound libraries.

FIG. 1 is a high level block diagram of a system for iterative searching and retrieval of sound files. User 102 interacts with client system 104, which may be a general purpose computer system such as a laptop of desktop computer, or a mobile device such as a tablet or smartphone. The client system hosts 104 iterative sound file retrieval application 106. In some implementations, application 106 is hosted in the cloud, with the client system providing the interactive user interface. The client system is connected to a wide area network, such as the Internet, and via this connection it communicates with one or more tagged sound libraries 108. It also has access to natural language processing service 110.

Figure 2A:
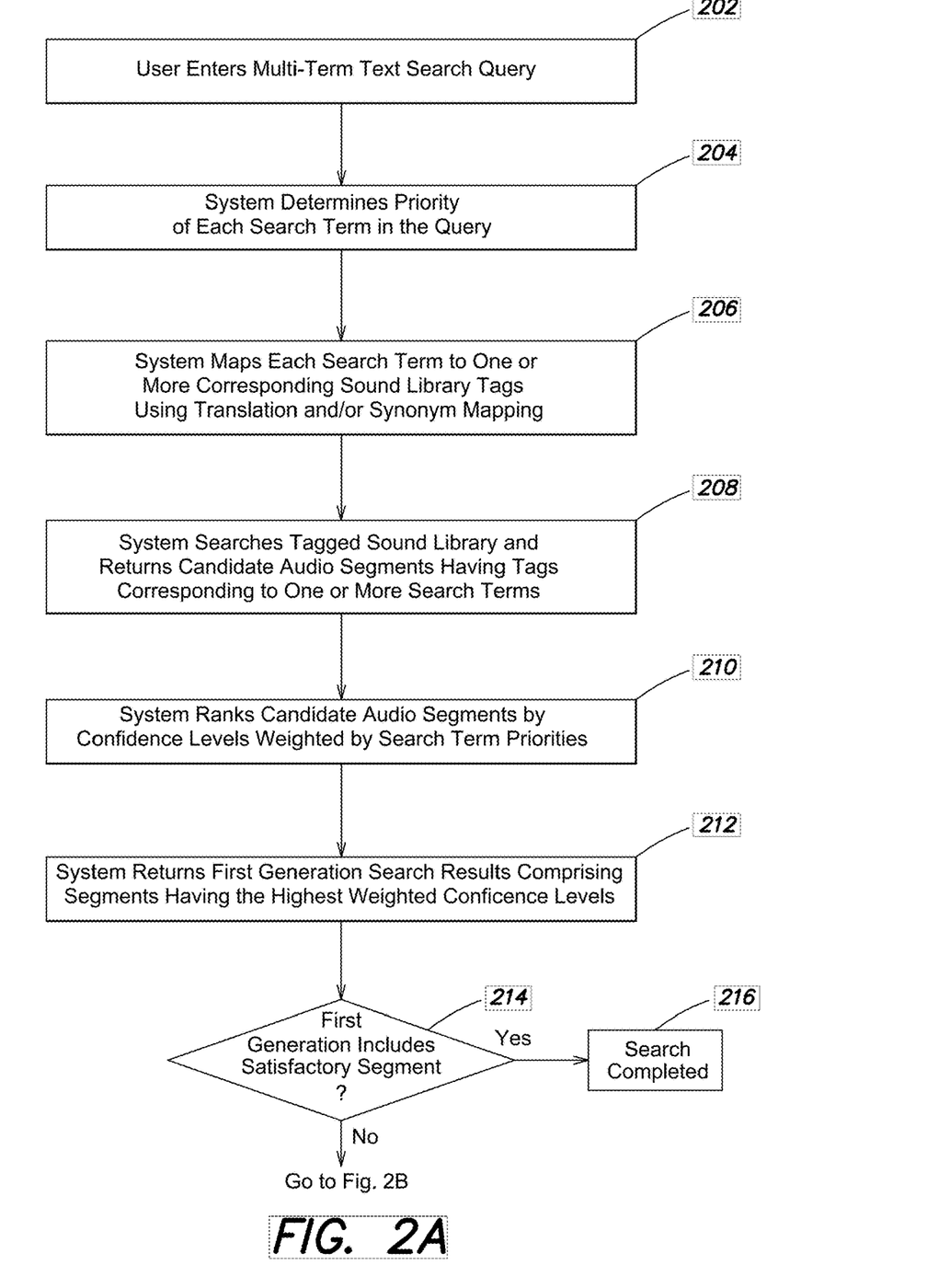
FIGS. 2A and 2B are flow diagrams showing the main steps involved in the described method of searching for audio files in a sound library.
Figure 2B:
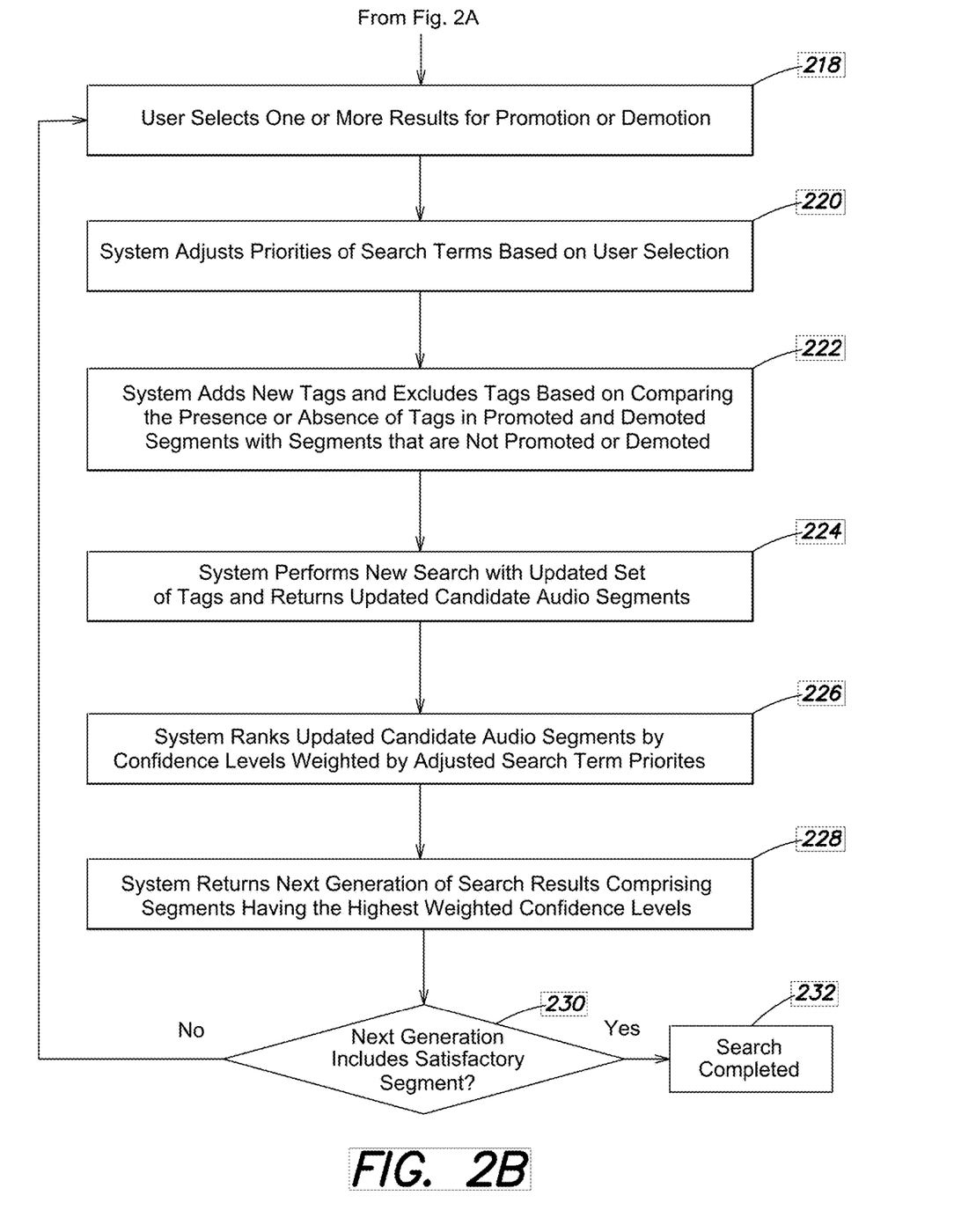

The steps involved in the described audio file searching methods are summarized in the high-level flow diagram shown in FIGS. 2A and 2B. In step 202, user 102 enters a multi-term text search query via client system 104. A multi-term search includes more than one word which is interpreted as a search term. The search query may be entered as a list of search terms $T_1, T_2, \ldots T_n$, or may be entered as a natural language phrase or sentence. In the latter case, the query is forwarded to natural language processing service 110, which parses the query and returns a list of search terms contained within the natural language query.

In step 204, the client system determines the relative priority ascribed to each of the search terms. In some cases, the priorities are explicitly specified by the user, who may enter a priority P for each search term, for example as a list of pairs $(T_1, P_1), (T_2, P_2), \ldots (T_n, P_n)$. In other use cases, the user enters only the natural language search query, and the intended priorities of the various search terms are automatically inferred from the order, grammar, and syntax of the query using various heuristics known in the art. For example, nouns in a subject clause are inferred to have higher priority for the user than modifying adjectives.

In step 206, the user-specified search terms are mapped into one or more tags that are used in the searched sound libraries. If the search query is in a different language from that used for the library tags, natural language translation from the query language to the library language is first performed. This may be provided by natural language processing service 110, or another service responsive to the requested translation. The initial search terms, i.e., those originally entered by the user, or translated search terms may correspond to existing tags used in one or more of the searched sound libraries. In many cases, however, the tags will not correspond directly to the search terms. To address this potential mismatch, the search terms are processed by a thesaurus that generates multiple synonyms for the search terms. The synonyms that correspond to library tags are used for the search. Even if the originally entered search term does appear as a tag in one or more of the searched libraries, the breadth of the search results may be enhanced by performing the search with both the originally entered term as well as its synonyms. When a search term is present as a tag in a searched library, candidates having the exact tag as opposed to a synonym may be ranked higher in the search results than the results responsive to synonym tags.

The priorities assigned to search terms based on the originally entered search terms are assigned the priorities of the originally entered search terms to which they correspond. For example, if a term is obtained by translation from an originally entered search term, it is given the same priority as that of the originally entered term. Similarly, a synonym used for the actual search is assigned the priority of the originally entered term of which it is a synonym.

Figure 3:
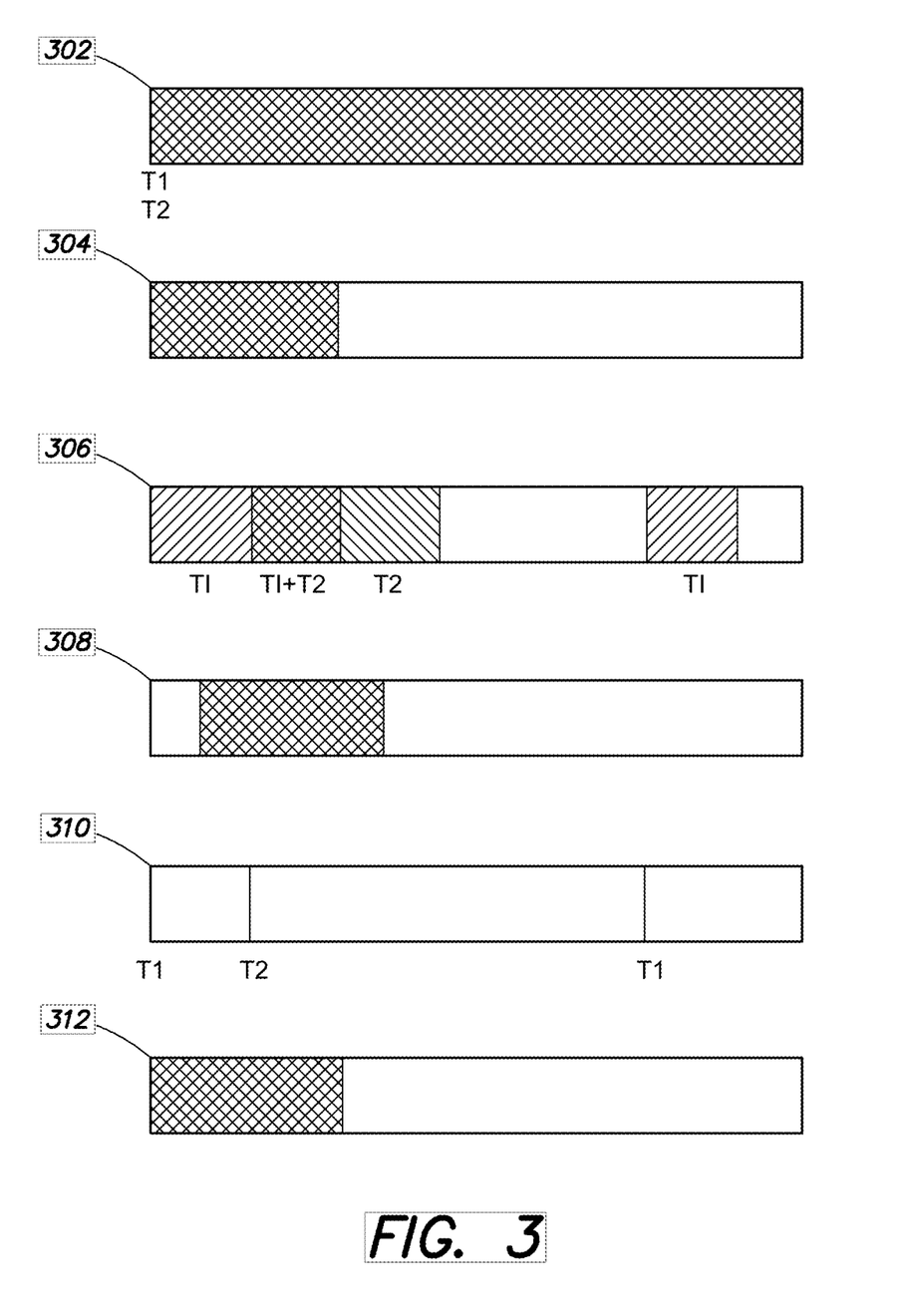
FIG. 3 illustrates a method of selecting segments from audio files based on the audio file tagging convention.

In step 208, the actual search is performed using the search terms based on the originally entered search terms, i.e., comprising terms that are translated from the user-entered term language into the sound library tag language if necessary, and synonyms, if any. The search identifies audio files in the searched libraries which are tagged with one or more of the searched terms and returns segments from the identified files to the client system as candidate audio segments. The details as to what portion of a responsive file is returned as a responsive segment depends in on the tagging convention deployed by the sound library. FIG. 3 illustrates an example as to how sound libraries having different tagging conventions are handled for a two-term search query. For libraries in which the tag is associated with entire sound file 302 (convention (i) above), the search application returns preview segment 304 of a predetermined length, such as 10 seconds. The segment duration may be expanded in a detailed window in the user interface as described below. For libraries in which tags are associated with the duration of the referenced sound, or with a fixed duration spanning the referenced sound (306, convention (ii) above), the search application returns preview segment 308 of the region in which both tags of a two-term search intersect, if any. As used herein, an intersection occurs when the sounds referred to by the tags occur simultaneously, or within a predetermined interval, such as 1-10 seconds. If the intersection occurs in more than one location in the file, each such location is ranked by weighted confidence and the location having the highest confidence is presented. For libraries in which tags reference a specific temporal location within a sound file without any duration (310, convention (iii) above), the search application presents segment 312 of a predetermined duration, such as 10 seconds, that spans the locations of tags corresponding to both search terms. If no such portion exists, the sound file is not deemed to be responsive to the query.

In various implementations, the user is able to specify whether sound files containing multiple tags corresponding to a multi-term search query are to be returned no matter where they occur in the sound file, or whether only files in which the tags corresponding to different terms occur together within the file are to be returned, where "together" may be defined as occurring within a pre-specified number of seconds of each other, such as 1, 5, or 10 seconds. The user's intention may be specified via the use of key words that are interpreted by the search application, such as $T_1$ AND $T_2$ for sound files in which the tags appear anywhere within the file, and $T_1$ WITH $T_2$ for sound files in which the tags for the multiple tags occur together.

For each candidate file, the sound library also returns a list of the one or more tags associated with the file that are responsive to the search query, and for each such tag, a confidence level that the sound corresponding to the tag is actually present in the file at the specified location.

In step 210, iterative sound file retrieval application 106 ranks the candidate audio segments files by the confidence levels of the responsive tags weighted by the priority of the search term to which it is responsive. In certain implementations, the normalized weighted confidence level $W_c$ of candidate audio file C is given by:

$$W_C = \sum_T R_T P_T \bigg/ \sum_T P_T$$

where $R_T$ is the raw confidence level provided by the database that a sound responsive to search term T is present in candidate sound file c, and $P_T$ is the priority of the search term T.

Figure 4:
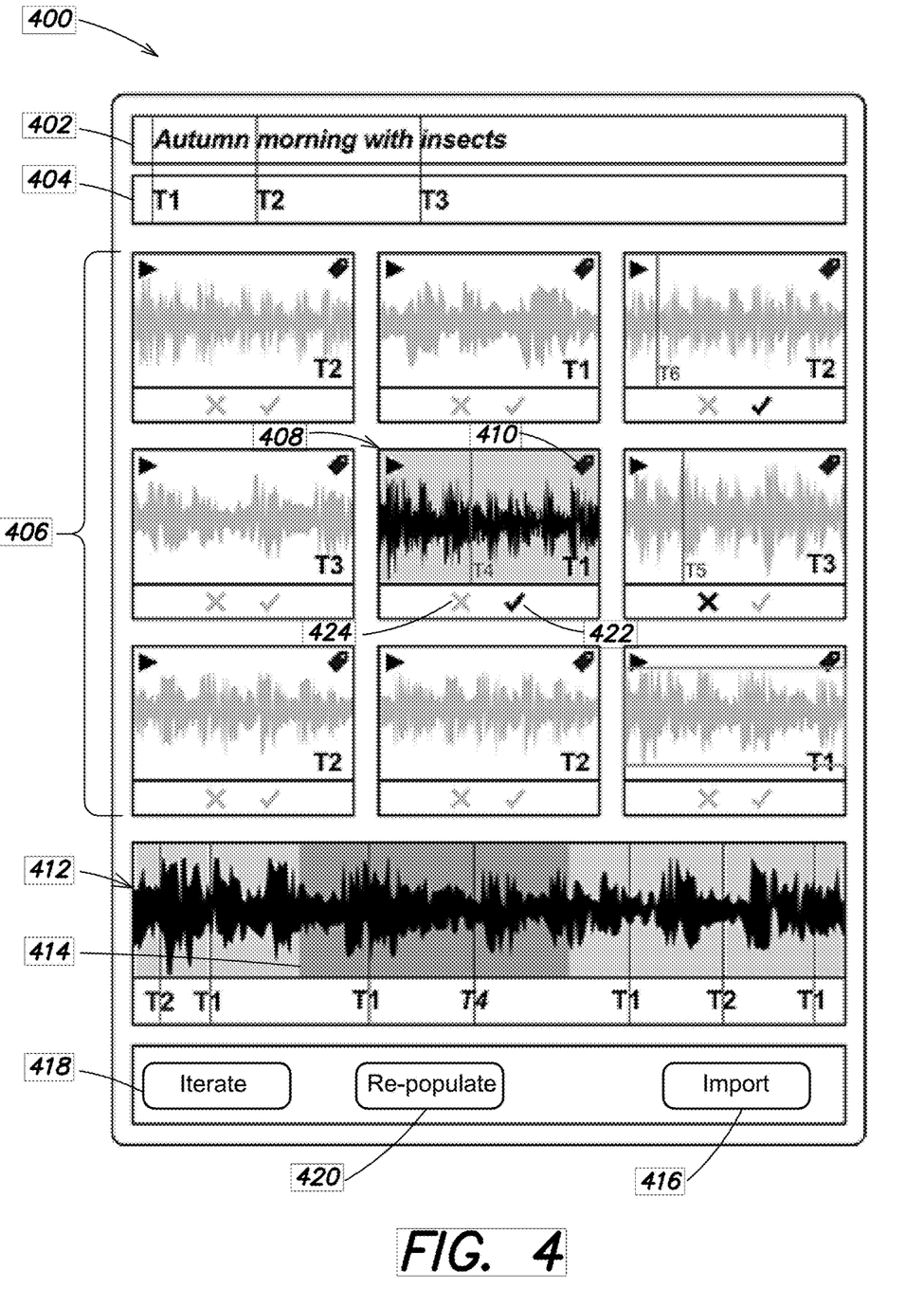
FIG. 4 is a diagrammatic screen shot of a user interface for iteratively searching sound libraries.
Figure 5:
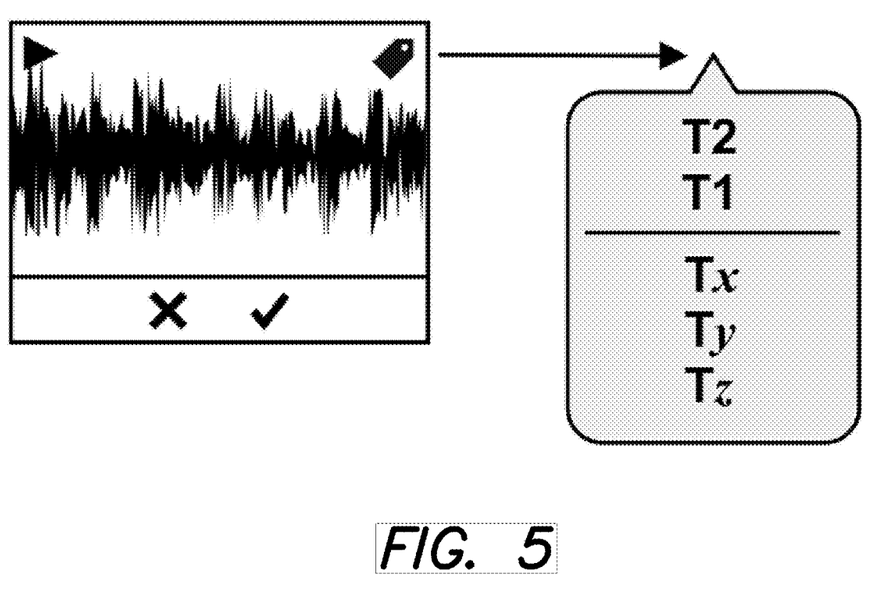
FIG. 5 illustrates the display of a set of tags having the highest confidence levels in a given search result.

In step 212, retrieval application 106 presents the user with a set of audio segments having the highest normalized weighted confidence level. FIG. 4 is a simplified screenshot of exemplary user interface 400 of retrieval application 106 in which the top-ranked results are presented to the user. Active text search query 402 includes three search terms: autumn, morning, and insects, which are listed, optionally in order of priority in box 404 below the query text. A set of top-ranked search results are presented with a graphical waveform representing the responsive audio segment within each file returned by the search. The duration indicated within each waveform corresponds to the duration of the segment associated with the responsive tag. In the illustrated example, nine results 406 are depicted, each including an indication of the highest confidence tag responsive to a search term within the query. For example, search result 408 is principally responsive to tag T1 (autumn), i.e., T1 is the searched tag having the highest confidence in the audio file. In various implementations, other tags present at high levels of confidence that do not correspond to a search term included in query 402 are also indicated for each of the displayed search results. In addition, for each result the user may view a set of tags, both searched and unsearched, that are present at high confidence levels within the result, which may serve as a distinctive characteristic of the search result. In the illustrated user interface, the user may request the display of the highest confidence tags for a given search result by selecting tag icon 410. The result is illustrated in FIG. 5, which shows a list of the tags appearing within the audio file at the highest confidence levels. Searched (T1, T2) and unsearched tags (Tx, Ty, Tz) may be listed separately, as illustrated, or combined into a single list ranked by confidence level.

When a user selects a particular result, e.g., result 408, an expanded version of the segment appears in window 412 providing the user with more temporal resolution in the waveform. In addition, the presence of other tags, both searched and unsearched may be shown in expanded view 412. While expanded segment window 412 may show the same temporal duration as displayed in the set of results 406, i.e., responsive segment 408, in expanded window 412, the user may zoom in or zoom out in order to adjust the selection to be imported. The user is able to important any portion of the candidate file, including the entire file, even if it includes material that is not shown as part of the returned segment displayed in the set of search results 406, which is selected to show the portions of the file associated with tags responsive to the search.

In order to increase the richness of the palette of sounds presented to the user, other methods of selecting the set of candidates may be used that are not exclusively based on weighted confidence levels of the searched tags. In one implementation, the set of displayed candidates is also based in part on the presence of tags that do not correspond to one of the search terms entered by the user. For example, the results may include high weighted confidence level audio segments that also contain non-search terms with high confidence and/or medium confidence levels. The addition of results in which non-search terms are taken into account offers the user both sounds that are expected (i.e., the ones based entirely on weighted confidence levels of the searched terms) and ones that are unexpected while still being responsive to the search query. Unexpected results may suggest new ideas and facilitate a more creative approach for the sound designer.

The user may audition each of the candidate search results using standard transport controls, such as playback, pause, skip forward/back together with a scrub bar showing current playback location within the waveform representation.

If the selected segment is acceptable to the sound designer, the designer may select portion 414 or the entire segment for import to an audio editing application using Import button 416. The audio editing application may be hosted on client system 104 which hosts the sound retrieval application, or it may be hosted on another platform in data communication with client system 104. The audio editing application may be a digital audio workstation, such as Pro Tools®, a product of Avid® Technology, Inc., of Burlington Mass.

Thus, after auditioning the results presented in step 212, in step 214, the user either finds a file that satisfies the requirement, in which case the search is completed (216) or if none of the first set of results meet the requirement, the user provides feedback as the basis for a new search. After providing feedback using methods such as those described next, the user may request a new generation of results be generated by selecting Iterate button 418. Alternatively, if none of the results are satisfactory and no feedback is provided, the user may request that a new search be conducted with the same search terms and search term priorities by selecting Repopulate button 420. Various methods may be used to generate a revised set of candidate segments when no feedback is provided. In one method, the revised set of candidates are the set having the next highest weighted confidences using the same search terms and priorities as for the first search. In another method, it is assumed that the user chose not to indicate a preference for any of the candidates because, although they contained a searched term to high confidence, they also included an unwanted sound at a high confidence level. For example, if the sound designer is searching for the sound of a microwave oven, but all the candidates have an unwanted sound as well, such as a dog barking, traffic noise, a child crying or a door closing, the Repopulate command excludes files that contain such tags in accordance with the presumption that they correspond to the unwanted sounds. The process iterates for one or more generations of searching and feedback until the user terminates the search.

The user's feedback may be provided as indicated in step 218, in which the user is able to demonstrate a preference for one or more of the returned candidate files that contain sounds that 4 are closer to what is desired by marking them for promotion. In the exemplary user interface shown in FIG. 4, a candidate segment may be promoted using check mark 422. Conversely, the user is able to indicate a disfavoring of one or more of the returned files if they are relatively less close to what is desired, and the user can mark them for demotion, such as by selecting X mark 424. In step 220, the search application uses this feedback to adjust the priorities, and in some cases also changes the set of tags to be used in the subsequent search (step 222). In various implementations, the user is able to mark a candidate result as a favorite, even if they are not selected for import to project. Such favorites can be retrieved, even after one or more subsequent searches that produce new generations of candidates. This may be especially useful for a situation in which the iterative process has unintentionally departed from what was initially intended, and the user wishes to circle back to an earlier search result.

The user's response to the first generation results are used to adjust the search term priorities for subsequent searches. The general approach is to identify high confidence tags in a promoted or demoted candidate as a key indicator of what caused the user to favor or disfavor a candidate, and to increase the priorities of tags that appear with high confidence in promoted results and conversely, for demoted files, to lower the priorities of search tags present in these files, even to the point of excluding them from subsequent search results. In addition, the confidence level of high confidence tags in promoted or demoted candidates is compared with the confidence of the same tags in the other candidates in order to determine if those tags actually constitute a distinctive characteristic or not. If they are indeed distinctive, the search term priorities are manipulated, and new terms added or removed, but if they are found not to be distinctive, no changes are made.

If a user promotes or demotes multiple candidate results, the system may determine whether more than one promoted or demoted candidate includes an un-searched tag (i.e., one that does not correspond to a search term in the search query) If this is found to be the case, such tags are used to adjust the searched terms even if they appear in the candidate file with low confidence. As a specific example, if multiple demoted candidates have a tag "barking" which others candidate files do not, that would be a clear indication that the user does not want "barking" in the next iteration. In order to exclude noise that stems from erroneously tagged sounds, all tags having a confidence level below a noise threshold level are ignored.

Some specific methods of adjusting the priorities include the following. The methods involve the use of a threshold confidence level. The value of the threshold may have a default value predefined by the search application, with an option for the user to override the default and choose the value themselves. In various use cases, the user may choose different threshold values for each of multiple searched sound libraries. The user may adjust the threshold value as a result of experimentation in order to optimize the search results. Generally, the lower the threshold confidence value, the more the subsequent generation results will vary from the prior generation, since there is a greater likelihood that priorities and the set of search terms will be adjusted.

For a promoted result, the priority of one or more high confidence tags it contains are increased, optionally up to the maximum priority, which would require that all subsequent search results must include this tag. If multiple first generation results are promoted, the high confidence tags in each promoted result are reassigned a higher priority. If the highest confidence component is the same in the multiple promoted results, the maximum, i.e., 100% priority is assigned.

The tags whose priorities may be increased are those that satisfy at least one of the following criteria: tags with a confidence value above the threshold confidence value; tags which occur in multiple segments, each occurrence having a confidence value below the threshold value, but which sum to a confidence value greater than the threshold; and tags that are present in at least half of the promoted candidates regardless of their confidence level. The magnitude of the upward priority adjustment i may be determined by one of the following methods: a predefined increase amount a is scaled by the number of times n the tag appears in the promoted candidates divided by the number of promoted candidates c, i.e., $i=n(a/c)$; the increase is scaled by the total number f of candidates containing the tag, i.e., $i=n(a/f)$; and the increase is given by $i=n(c(a/f))$.

If the user demotes certain candidates, the priority of certain tags present in the demoted candidate is decreased, potentially down to zero, which would imply that results containing such a tag are excluded from the results. The tags whose priorities are adjusted in this fashion may be those having confidence levels that satisfy the same criteria as for those whose priorities are increased, as described above, and the amount of downward adjustment may be determined using one the methods described above for the amount by which priorities of certain tags are increased. For tags that are present in all of the demoted candidates but are absent from candidates that are not demoted, and which have confidence levels below the threshold confidence value, the tag is removed from the search query used for subsequent search iterations.

In addition to the adjustment of search term priorities, the user's feedback on the search results is used to adjust the set of search terms themselves (and therefore the set of searched tags that correspond to the search terms) that are used in subsequent search iterations (step 222). In general, unsearched tags associated with high confidence with promoted results are added to the set of tags to be searched in subsequent iterations, and conversely, unsearched tags associated with high confidence with demoted results are used to exclude results from subsequent searches.

Specific methods of adjusting the set of search terms may include the following. Unsearched tags that appear in promoted candidates are added to the set of search terms if they do not appear in any of the unpromoted candidates or if the sum of their confidence levels across all the promoted candidates exceeds the threshold confidence level value, even if these tags also appear within unpromoted candidates. The priority assigned to such unsearched tag additions may equal the value of the tag's confidence level averaged over the promoted candidates in which they appear. Tags may also be used to explicitly exclude certain audio files from appearing in subsequent search results. In this case, the tags are retained as part of the search query, but with an exclusion operator such that a file is not deemed to be responsive to the search if it contains an excluded tag. Such tags may be identified as those present with a confidence value exceeding the threshold value in all demoted results, and not present in all results that are not demoted (whether promoted or not).

When the user feedback to a given set of search results includes both promotion of one or more selected candidates and demotion of one or more selected candidates, a combination of the specific methods described above may be applied.

In step 224, the search application instigates a new search using the set of tags that has been updated as described based on the user's feedback on the prior generation search results. In step 226, the results are again ranked using the priority-weighted confidence levels, but the priorities used in the weighting are also updated based on the user's feedback to the prior generation of search results, as described above. In step 228, the system presents the user with revised search results having the highest weighted confidence levels derived from the updated set of tags and priorities.

The user is next able to use user interface 400 with the next generation results to determine whether the new results include an audio file containing a segment that adequately satisfies the user (step 230). If yes, the search is concluded (step 232), but if not, the system may iterate again, inviting the user to provide further feedback, and repeating steps 218 to 230 until a satisfactory audio segment is found.

The various components of the system described herein may be implemented as a computer program using a general-purpose computer system. Such a computer system typically includes a main unit connected to both an output device that displays information to an operator and an input device that receives input from an operator. The main unit generally includes a processor connected to a memory system via an interconnection mechanism. The input device and output device also are connected to the processor and memory system via the interconnection mechanism.

One or more output devices may be connected to the computer system. Example output devices include, but are not limited to, liquid crystal displays (LCD), plasma displays, various stereoscopic displays including displays requiring viewer glasses and glasses-free displays, cathode ray tubes, video projection systems and other video output devices, loudspeakers, headphones and other audio output devices, printers, devices for communicating over a low or high bandwidth network, including network interface devices, cable modems, and storage devices such as disk, tape, or solid state media including flash memory. One or more input devices may be connected to the computer system. Example input devices include, but are not limited to, a keyboard, keypad, track ball, mouse, pen and tablet, touchscreen, camera, communication device, and data input devices. The invention is not limited to the particular input or output devices used in combination with the computer system or to those described herein.

The computer system may be a general-purpose computer system, which is programmable using a computer programming language, a scripting language or even assembly language. The computer system may also be specially programmed, special purpose hardware. In a general-purpose computer system, the processor is typically a commercially available processor. The general-purpose computer also typically has an operating system, which controls the execution of other computer programs and provides scheduling, debugging, input/output control, accounting, compilation, storage assignment, data management and memory management, and communication control and related services. The computer system may be connected to a local network and/or to a wide area network, such as the Internet. The connected network may transfer to and from the computer system program instructions for execution on the computer, media data such as video data, still image data, or audio data, metadata, review and approval information for a media composition, media annotations, and other data.

A memory system typically includes a computer readable medium. The medium may be volatile or nonvolatile, writeable or nonwriteable, and/or rewriteable or not rewriteable. A memory system typically stores data in binary form. Such data may define an application program to be executed by the microprocessor, or information stored on the disk to be processed by the application program. The invention is not limited to a particular memory system. Time-based media may be stored on and input from magnetic, optical, or solid-state drives, which may include an array of local or network attached disks.

A system such as described herein may be implemented in software, hardware, firmware, or a combination of the three. The various elements of the system, either individually or in combination may be implemented as one or more computer program products in which computer program instructions are stored on a non-transitory computer readable medium for execution by a computer or transferred to a computer system via a connected local area or wide area network. Various steps of a process may be performed by a computer executing such computer program instructions. The computer system may be a multiprocessor computer system or may include multiple computers connected over a computer network or may be implemented in the cloud. The components described herein may be separate modules of a computer program, or may be separate computer programs, which may be operable on separate computers. The data produced by these components may be stored in a memory system or transmitted between computer systems by means of various communication media such as carrier signals.

Having now described an example embodiment, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention.

What is claimed is:

1. A method locating an audio file for import into an audio editing application, the method comprising:
  receiving an initial search query from a user, the query comprising an initial plurality of search terms;
  for each search term of the initial plurality of search terms, determining from the search query a priority for the search term;
  issuing a first search query comprising a first plurality of search terms to one or more audio file databases, wherein the first search query is based on the initial search query;
  receiving a plurality of candidate audio files responsive to the first search query;
  for each candidate audio file of the plurality of received candidate audio files, determining a confidence level weighted by search term priorities that the candidate includes the first plurality of search terms;
  presenting first generation search results to the user, wherein the first generation results comprise a set of audio files of the plurality of candidate audio files ranking highest in weighted confidence level;
  receiving an indication from the user of at least one of a preference for a selected one of the first generation results and a disfavoring of a selected one of the first generation results; and
  in response to receiving the user preference:
    if the indication from the user includes a preference for a selected one of the first generation results, automatically generating a revised search query by adding a new search term to the search query, wherein the new search term is a term associated with high confidence with the selected one of the first generation results; and
    if the indication from the user includes a disfavoring of a selected one of the first generation results, automatically generating a revised search query by adding a new search term preceded by an exclusion operator, wherein the new search term is a term associated with high confidence with the disfavored one of the first generation results;
  issuing the revised search query to the one or more audio file databases;
  receiving a second plurality of candidate audio files responsive to the revised search query;
  for each candidate audio file of the second plurality audio files, determining a confidence level weighted by priorities of search terms of the revised search query that the candidate includes search terms of the revised search query;
  presenting second generation search results to the user, wherein the second generation results comprise a set of sound files of the second plurality of candidate audio files ranking highest in weighted confidence level; and
  enabling the user to import one or more of the second plurality of candidate audio files ranking highest in weighted confidence level into the audio editing application.

2. The method of claim 1 wherein the priority of an initial search term is determined from a priority explicitly specified by the user.

3. The method of claim 1, wherein the determination of the priority of an initial search term is based on a syntax of the search query.

4. The method of claim 1, further comprising:
  if the indication from the user includes a preference for a selected one of the first generation results, adjusting upwards a priority of a search term present with high confidence in the selected one of the first generation results; and
  wherein the weighted confidence levels of the second plurality of candidate audio files are determined using the adjusted priority of the search term.

5. The method of claim 4, wherein the search term is included within the first search query.

6. The method of claim 4, wherein the search term is not included in the first search query.

7. The method of claim 1, further comprising:
  if the indication from the user includes a disfavoring of a selected one of the first generation results, adjusting downwards a priority of a search term present with high confidence in the selected one of the first generation results; and
  wherein the weighted confidence levels of the second plurality of candidate audio files are determined using the adjusted priority of the search term.

8. The method of claim 7, wherein the search term is included within the first search query.

9. The method of claim 7, wherein the search term is not included in the first search query.

10. The method of claim 1, wherein presenting first generation results to the user includes, for each audio file of the plurality of candidate audio files, displaying an audio waveform view of a segment of the candidate audio file, the segment including a portion of the candidate audio file associated with a search term of the first plurality of search terms.

11. The method of claim 10, wherein the search term of the first plurality of search terms is the search term of the first plurality of search terms that has the highest confidence level in the candidate audio file.

12. The method of claim 10, wherein the search term is displayed in association with the waveform display.

13. The method of claim 1, further comprising:
  in response to the user selecting a candidate audio file:
    displaying a detailed waveform representation of the selected candidate audio file, the detailed waveform representation including a display of each of a plurality of search terms associated with the selected candidate audio file.

14. The method of claim 13, wherein the user is able to select in the detailed waveform representation a portion of the selected audio file to be imported into an audio editing application.

15. The method of claim 1, wherein the first plurality of search terms includes one or more synonyms of the initial plurality of search terms.

16. The method of claim 1, wherein the first plurality of search terms represents a mapping of the initial plurality of search terms onto search terms that are associated with audio files in the one or more audio file databases.

17. The method of claim 1, wherein the first plurality of search terms includes one or more search terms that are translations of one or more search terms of the initial plurality of search terms from a first language into a second language.

18. The method of claim 1, wherein presenting the first generation results includes, for each candidate audio file an indication of a set of terms associated at a high confidence level with sounds that are present in the audio file.

19. The method of claim 1, wherein:
for each candidate audio file C of the plurality of the received candidate audio files, the weighted confidence level We given by $$W_C = \sum_T R_T P_T \Big/ \sum_T P_T$$

wherein $R_T$ is a confidence received from a database that returned candidate audio file C that a sound responsive to search term T is present in candidate sound file C, $P_T$ is the priority of the search term T, and $\Sigma_T$ is a summation over the first plurality of search terms; and
for each candidate audio file C' of the second plurality of audio files, the weighted confidence level $W_{C'}$ given by $$W_{C'} = \sum_{T'} R_{T'} P_{T'} \Big/ \sum_{T'} P_{T'}$$

wherein $R_{T'}$ is a confidence received from a database that returned candidate audio file C' that a sound responsive to search term T' is present in candidate sound file C', $P_{T'}$ is the priority of the search term T', and $\Sigma_{T'}$ is a summation over each search term T' of the plurality of revised search terms.

20. A computer program product comprising:
a non-transitory computer-readable medium with computer-readable instructions encoded thereon, wherein the computer-readable instructions, when processed by a processing device instruct the processing device to perform a method of locating an audio file for import into an audio editing application, the method comprising:
receiving an initial search query from a user, the query comprising an initial plurality of search terms;
for each search term of the initial plurality of search terms, determining from the search query a priority for the search term;
issuing a first search query comprising a first plurality of search terms to one or more audio file databases, wherein the first search query is based on the initial search query;
receiving a plurality of candidate audio files responsive to the first search query;
for each candidate audio file of the plurality of received candidate audio files, determining a confidence level weighted by search term priorities that the candidate includes the first plurality of search terms;
presenting first generation search results to the user, wherein the first generation results comprise a set of audio files of the plurality of candidate audio files ranking highest in weighted confidence level;
receiving an indication from the user of at least one of a preference for a selected one of the first generation results and a disfavoring of a selected one of the first generation results; and
in response to receiving the user preference:
if the indication from the user includes a preference for a selected one of the first generation results, automatically generating a revised search query by adding a new search term to the search query, wherein the new search term is a term associated with high confidence with the selected one of the first generation results; and
if the indication from the user includes a disfavoring of a selected one of the first generation results, automatically generating a revised search query by adding a new search term preceded by an exclusion operator, wherein the new search term is a term associated with high confidence with the disfavored one of the first generation results;
issuing the revised search query to the one or more audio file databases;
receiving a second plurality of candidate audio files responsive to the revised search query;
for each candidate audio file of the second plurality audio files, determining a confidence level weighted by priorities of search terms of the revised search query that the candidate includes search terms of the revised search query;
presenting second generation search results to the user, wherein the second generation results comprise a set of sound files of the second plurality of candidate audio files ranking highest in weighted confidence level; and
enabling the user to import one or more of the second plurality of candidate audio files ranking highest in weighted confidence level into the audio editing application.

21. A system comprising:
a memory for storing computer-readable instructions; and
a processor connected to the memory, wherein the processor, when executing the computer-readable instructions, causes the system to perform a method of locating an audio file for import into an audio editing application, the method comprising:
receiving an initial search query from a user, the query comprising an initial plurality of search terms;
for each search term of the initial plurality of search terms,
determining from the search query a priority for the search term;
issuing a first search query comprising a first plurality of search terms to one or more audio file databases, wherein the first search query is based on the initial search query;
receiving a plurality of candidate audio files responsive to the first search query;
for each candidate audio file of the plurality of received candidate audio files, determining a confidence level weighted by search term priorities that the candidate includes the first plurality of search terms;
presenting first generation search results to the user, wherein the first generation results comprise a set of audio files of the plurality of candidate audio files ranking highest in weighted confidence level;
receiving an indication from the user of at least one of a preference for a selected one of the first generation results and a disfavoring of a selected one of the first generation results; and
in response to receiving the user preference:
if the indication from the user includes a preference for a selected one of the first generation results, automatically generating a revised search query by adding a new search term to the search query, wherein the new search term is a term associated with high confidence with the selected one of the first generation results; and if the indication from the user includes a disfavoring of a selected one of the first generation results, automatically generating a revised search query by adding a new search term preceded by an exclusion operator, wherein the new search term is a term associated with high confidence with the disfavored one of the first generation results;

issuing the revised search query to the one or more audio file databases;

receiving a second plurality of candidate audio files responsive to the revised search query;

for each candidate audio file of the second plurality audio files, determining a confidence level weighted by priorities of search terms of the revised search query that the candidate includes search terms of the revised search query;

presenting second generation search results to the user, wherein the second generation results comprise a set of sound files of the second plurality of candidate audio files ranking highest in weighted confidence level; and enabling the user to import one or more of the second plurality of candidate audio files ranking highest in weighted confidence level into the audio editing application.

\* \* \* \* \*